United States Patent [19]
Cretors

[11] 3,739,953
[45] June 19, 1973

[54] POPCORN OIL METERING DEVICE
[75] Inventor: Charles D. Cretors, Deerfield, Ill.
[73] Assignee: C. Cretors & Co., Chicago, Ill.
[22] Filed: Aug. 27, 1971
[21] Appl. No.: 175,674

[52] U.S. Cl.................. 222/318, 99/323.8, 222/444
[51] Int. Cl................................................ A23l 1/18
[58] Field of Search .................... 222/71, 109, 318,
222/424, 444; 99/323.4, 323.11, 238.1, 238.7

[56] References Cited
UNITED STATES PATENTS
2,951,618  9/1960  Aldecoa........................... 222/318 X
2,565,045  8/1951  Ray..................................... 222/444

Primary Examiner—Robert B. Reeves
Assistant Examiner—Thomas E. Kocovsky
Attorney—Michael O. Warnecke and James T. Williams

[57] ABSTRACT

A popcorn oil metering device and method for delivering a predetermined volume of popping oil to a popper. Oil continuously pumped to a static head elevation controlled by an arched manifold rises through three-way valves to an equivalent head in a plurality of metering chambers prior to release into the popper by the three-way valve. The predetermined volume metered may be altered by the insertion of volume displacement washers in the metering chamber, adjusting metering chamber air vent capabilities, or varying arch manifold elevation which controls the static head elevation and level of rise in the metering chamber.

2 Claims, 2 Drawing Figures

PATENTED JUN 19 1973 3,739,953

POPCORN OIL METERING DEVICE

BACKGROUND OF THE INVENTION

The field of the invention relates to a popcorn oil metering device and a method for delivering a predetermined volume of popping oil to poppers.

The production of large quantities of uniformly popped and seasoned popcorn requires accurate and consistent measurement of the ingredients utilized in the popping and seasoning operation. Popping oil is a critical ingredient which must be closely controlled in volume and consistency as it enters the popper to ensure fresh uniform seasoning and popping. Usually, a series of independent poppers are operated simultaneously, with the popping oil being delivered to a plurality of poppers as they begin their respective cycles. Popper means and oil delivery devices heretofore known have required substantial operator skill, have been complex mechanisms difficult to adjust, and have failed to maintain the popping oil at proper volume and consistency.

Denniss U.S. Pat. No. 2,858,761 discloses a measuring chamber filled with oil through the use of a vacuum. In this arrangement, the operator manipulates a series of manual valves to meter a desired volume of oil into the poppers. The oil does not flow continuously through the metering system to ensure freshness, and adjustments for the volume of oil delivered to the popper are not indicated.

Roach U.S. Pat. No. 1,976,142 proposes a measuring chamber utilizing an actuated piston which closes the oil inlet port and proceeds to force the remaining entrapped popping oil into the popper. Again, oil does not flow continuously through the system and no adjustment provisions are included.

Quick U.S. Pat. No. 2,194,074 describes an oil metering apparatus which circulates the popping oil. Intermittently, a hollow or cupped piston is filled with oil and manually lifted and emptied into the popper by the operator; however, no volume adjustment is mentioned.

The problem of maintaining a continuous flow of fresh, uniform oil while metering predeterminable and adjustable volumes of oil to the poppers without the need for skilled operators has been heretofore unknown.

SUMMARY OF THE INVENTION

It is an object of this invention to provide a popcorn oil metering device and method which will obviate the problems present in the prior art, heretofore described.

Other objects will become apparent from the description, drawing and claims.

In the subject invention, fresh popping oil is continuously circulated through an oil manifold vessel by a pump means from an oil reservoir containing oil. Valve feeder tubes are connected to the manifold vessel at each popper location for feeding popping oil to three-way valves located thereon. To initiate the metering operation, the three-way valve is rotated to a charge mode of operation which directs oil from the valve feeder tubes through the chamber port of the three-way valve into the oil filler tube such that oil flows into the metering chamber through the lower lateral aperture in the oil filler tube. Popping oil fills the metering chamber, simultaneously forcing air in the metering chamber out of the upper lateral aperture in the oil filler tube. Oil volume displacement washers of varying size may be placed in the metering chamber for the purpose of allowing adjustment and predetermination of the volume of oil subsequently metered to the popper means. Also, the upper lateral aperture in the oil filler tube may be raised or lowered vertically along the oil filler tube to adjust the level of oil attained in the metering chamber. Air entrapped in the metering chamber, above the level of the upper lateral aperture of the oil filler tube, stops the oil level from rising above the upper aperture in the metering chamber. As the oil level in the metering chamber reaches the upper lateral aperture in the oil filler tube, the oil level thereafter continues to rise in the oil filler tube. The rising oil in the oil filler tube is under the same static pressure as the oil in the manifold vessel and, therefore, rises to the same static head. The static head in the manifold vessel can be raised or lowered by adjusting the height of an arch in the manifold vessel. After the oil reaches the maximum level, as determined by the arched manifold, the predetermined volume of oil is available for delivery to the popper means.

Secondly, the three-way valve is rotated to discharge mode of operation which allows the predetermined volume of oil in the metering chamber to pass directly back through the three-way valve into the oil discharge tube and into the popper means. When all the popping oil has drained from the metering chamber, the three-way valve is again rotated to charge mode of operation for refilling the metering chamber for another cycle.

BRIEF DESCRIPTION OF THE DRAWING

In the accompanying drawings, wherein the same reference numerals designate the same or similar parts in all of the views.

DESCRIPTION OF THE PREFERRED EMBODIMENTS

Figure 1:
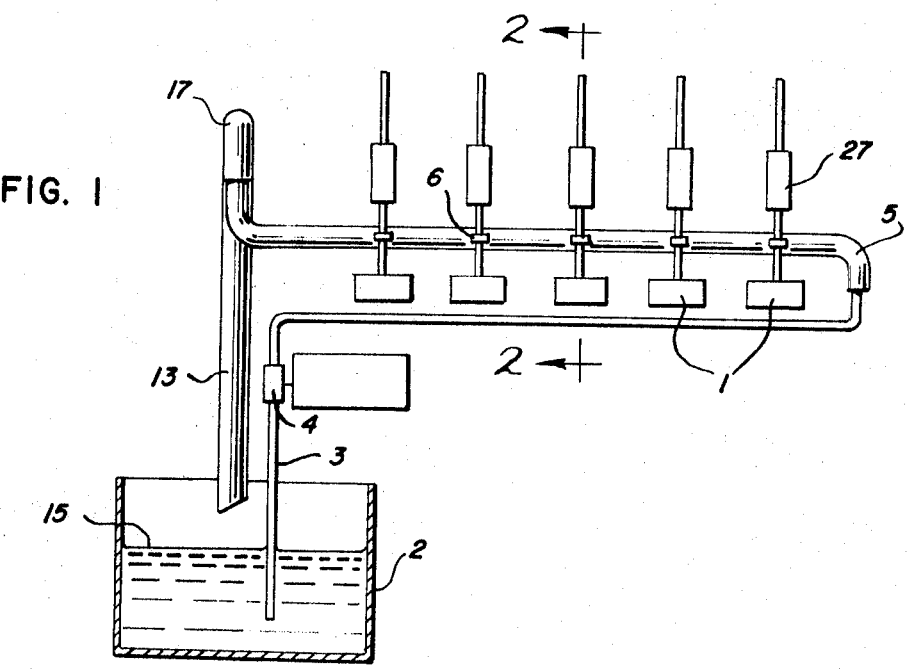
FIG. 1 is a frontal view of a series of popper means utilizing the oil metering device with a vertical section view of the oil reservoir showing the oil contained therein, with certain components being shown diagrammatically.

Referring to the drawing, an oil metering or measuring apparatus is shown which is capable of delivering a predetermined volume of oil 15, such as popping oil or other liquid ingredient or seasoning, to a conventional corn popper means 1, as depicted in FIG. 1. Popper means 1 is defined herein to include popcorn poppers, as well as poppers used in the production of other similar foodstuffs.

Figure 2:
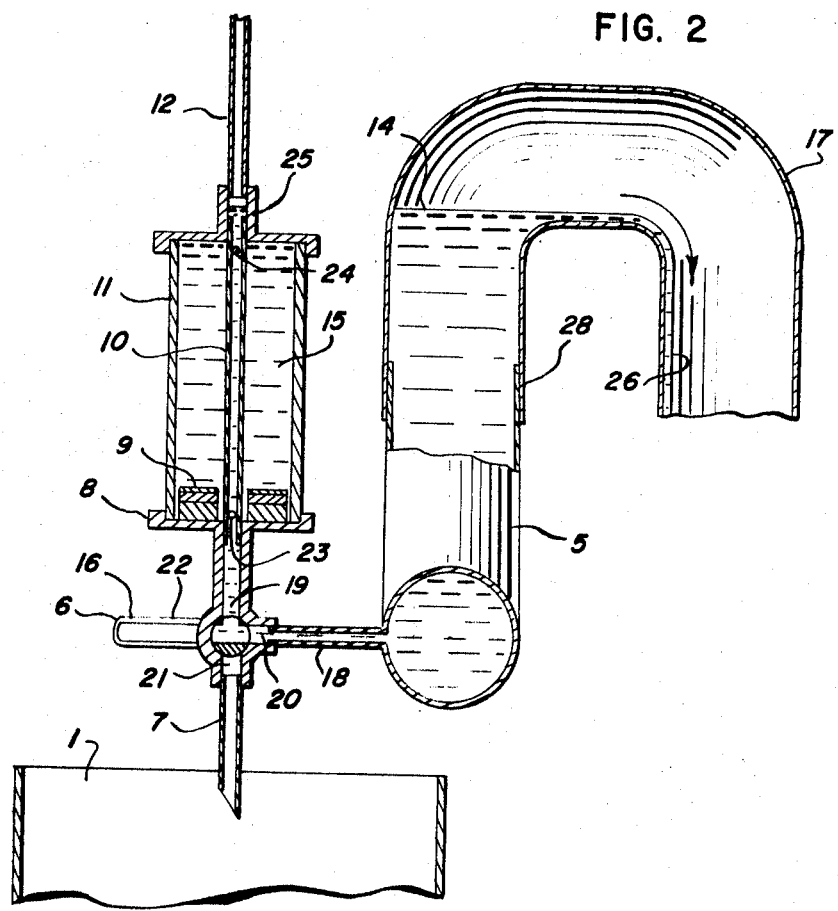
FIG. 2 is an enlarged vertical section view of FIG. 1 along line 2—2, showing in detail certain components of the invention.

A means for maintaining a static head 14 of continuously flowing popping oil 15 is necessary and can be achieved by pumping the oil 15 through an oil manifold vessel 5 and over an arched portion 17, as shown in FIGS. 1 and 2. The oil 15 is pumped through an oil manifold vessel 5 of sufficient diameter to ensure negligible pressure variations along its length as excess oil 26 continuously flows over the arched portion 17. The static head 14 elevation may ve varied by varying the elevation of the adjustable arched portion 17, through the use of a sealed telescoping section, such as a slip-joint union 28, as shown in FIGS. 1 and 2. An oil inlet tube 3 connected to a pump means 4 may be used to pump the oil 15 through the oil manifold vessel 5 from an oil reservoir containing oil 2.

Valve feeder tubes 18 are connected to the oil manifold vessel 5 for delivering oil 15, under static head 14 pressure, to a series of three-way valves 6. FIG. 2 shows a cross-sectional view of a valve feeder tube 18 projecting horizontally from the oil manifold vessel 5. Preferably, these valve feeder tubes 18 would be located above each popper means 1. When the pump means 4 is in operation and pumping at a rate sufficient to maintain static head 14, there exists a like pressure in each valve feeder tube 18, which pressure is dependent on the static head 14 elevation.

Secondly, an apparatus for directing the oil 15 into metering chambers is provided. This apparatus can be a valve, such as a conventional three-way valve 6. Referring to FIG. 2, a three-way valve 6 with a charge and discharge mode of operation defining a discharge port, chamber port, and inlet port, is shown interconnecting a valve feeder tube 18 and a metering chamber 11. In FIG. 2, the three-way valve 6 is in charge mode of operation 22, and direction of flow is indicated by arrows therein. Charge mode of operation 22 comprises that position of the three-way valve 6 which charges or delivers oil 15 to the metering chamber 11 from the oil manifold vessel 5 through valve feeder tubes 18. Discharge mode of operation (not shown) of the three-way valve 6 is that position of the three-way valve 6 which drains or releases the oil 15 from the metering chamber 11 into the popper means 1. Discharge mode of operation for the three-way valve shown in FIG. 2 is achieved by rotating the valve handle 16 downwardly 90° from horizontal which closes inlet port 20 and interconnects the chamber port 19 with the discharge port 21. Preferably, an oil discharge tube 7 is connected to the discharge port 21 of the three-way valve 6 and extends to the popper means 1 through which oil 15, released from the metering chamber 11, flows. It should be understood that the apparatus for directing oil 15 into the metering chamber 11 may comprise devices other than the preferred three-way valve 6 shown in FIG. 2.

A chamber base 8 is connected to the chamber port 19 of the three-way valve 6, such that a metering chamber defining an air vent connector 25 may be secured to the chamber base 8. An air vent tube 12 is secured to the air vent connector 25 of metering chamber 11, as shown in FIG. 2. Between the chamber base 8 and the air vent connector of the metering chamber 11 is positioned an oil filler tube 10 defining a lower and upper lateral aperture. Oil volume displacement washers 9 may be positioned in the metering chamber 11 to vary the available volume of the metering chamber 11. The washers 9 may be utilized to effect volumetric adjustments in the metering chambers 11.

When three-way valve 6 is in charge mode of operation 22 (FIG. 2), oil 15 under static head 14 pressure flows through the chamber port 19, into the oil filler tube 10, and outward through the lower lateral aperture 23. As oil 15 flows outward through lower lateral aperture 23 and rises in the metering chamber 11, air entrapped in the metering chamber 11 is forced through the upper lateral aperture 24 and outward through the air vent tube 12. The oil level in the metering chamber 11 continues to rise until the oil level reaches the upper lateral aperture 24, after which entrapped air in the metering chamber 11 stops the oil 15 from rising in the metering and the oil begins to rise in the oil filler tube 10. The oil 15 rises to an elevation equivalent to the elevation of the static head 14 in the arched portion 17 of the manifold vessel 5. Oil 15 flowing through manifold vessel 5 which is not utilized during a charging mode of operation 22 becomes excess oil 26 and is returned to the oil reservoir 2 by an oil return tube 13 connected to the arched portion 17 of the manifold vessel 5.

By raising or lowering the elevation of the upper lateral aperture 24, the level of oil 15 rising within the metering chamber 11 may be raised or lowered accordingly. Such means for controlling the amount of oil in the chamber 11 provides adjustment for the predetermined volume of oil 15 delivered to the popper means 1.

Varying the elevation of the adjustable arched portion 17 of the oil manifold vessel 5 varies the elevation of the static head 14 elevation accordingly, which also adjusts the predetermined volume delivered to the popper means 1.

To deliver the predetermined volume of oil 15 to the popper means 1, the valve handle 16 is rotated to a vertical position (not shown), or discharge mode of operation, which releases or drains the predetermined volume of oil 15 from the metering chamber 11 through the three-way valve 6 and discharge tube 7 into the popper means 1. After all the oil 15 has been drained from the metering chamber 11, the valve handle 16 may be rotated to the horizontal position shown in FIG. 2 to charge the metering chamber 11 again.

It is to be understood that the metering device may be used to feed liquids other than popcorn oil, and that the preceding description is an example of only one use of the invention.

Thus, it is apparent that a metering device has been provided which assures a continuous flow of product, is capable of delivering a predetermined amount of product, and is capable of being adjusted to control the volume of product to be metered.

While a particular embodiment of the invention has been shown, it is understood that the invention is not limited thereto since many minor modifications may be made which fall within the true spirit and scope of the invention.

The invention having thus been described, what is claimed and desired to be secured by Letters Patent is:

1. An oil metering apparatus for a popper means, which comprises:
   an oil reservoir containing oil;
   an oil inlet tube connected to said oil reservoir such that said oil inlet tube engages said oil;
   a pump means connected to said oil inlet tube such that said oil in said reservoir is forced to flow continuously from said oil reservoir through said oil inlet tube and said pump means;
   an oil manifold vessel defining an adjustable arched portion and valve feeder tube, connected to said pump means such that said oil flows into said oil manifold vessel and valve feeder tube to a static head elevation of said adjustable arched portion;
   a three-way valve with a charge and discharge mode of operation defining a discharge port, chamber port, and inlet port, connected to said valve feeder tube adjacent said inlet port such that said oil flows into said inlet port and outwardly through said chamber port when said three-way valve is in charge mode of operation;

an oil discharge tube connected to said discharge port such that when said three-way valve is in discharge mode of operation, said oil may flow through said oil discharge tube into a popper means located therebelow;

a chamber base connected to said chamber port;

an oil volume displacement washer positioned on said chamber base whereby the oil volume is varied;

an oil filler tube defining a lower and upper lateral aperture with the lower portion of said tube secured to said chamber base such that varying the elevation of said upper lateral aperture varies the oil volume metered;

a metering chamber having a predetermined volume defining an air vent connector, outwardly concentric from said oil filler tube and said chamber secured to said chamber base and said filler tube secured to said air vent connector;

an air vent tube secured to said air vent connector whereby air is vented and said oil rises from said metering chamber; and an oil return tube connected to said arched portion of said oil manifold vessel and disposed in said oil reservoir whereby excess oil is returned to said reservoir.

2. An oil metering apparatus as recited in claim 1, wherein an oil volume displacement means is positioned on said chamber base for varying the volume of oil distributed to the popper.

* * * * *